(12) United States Patent
Liang et al.

(10) Patent No.: US 11,468,909 B1
(45) Date of Patent: Oct. 11, 2022

(54) ZERO SKEW WITH ULTRASONIC PIEZOELECTRIC SWING SUSPENSION

(71) Applicant: Seagate Technology LLC, Fremont, CA (US)

(72) Inventors: Cho Kok Liang, Singapore (SG); Xiong Liu, Singapore (SG); Than Zaw Myint, Singapore (SG); Yichao Ma, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/517,061

(22) Filed: Nov. 2, 2021

(51) Int. Cl.
*G11B 5/48* (2006.01)

(52) U.S. Cl.
CPC .................................. *G11B 5/484* (2013.01)

(58) Field of Classification Search
None
See application file for complete search history.

(56) References Cited

U.S. PATENT DOCUMENTS

| | | | |
|---|---|---|---|
| 4,034,613 A | 7/1977 | Halfhill et al. | |
| 4,189,759 A | 2/1980 | Bauck et al. | |
| 4,287,445 A | 9/1981 | Lienau | |
| 4,322,840 A | 3/1982 | Kusaka | |
| 4,376,294 A | 3/1983 | Meier et al. | |
| 4,392,165 A | 7/1983 | Wright | |
| 4,545,046 A | 10/1985 | Jansen et al. | |
| 4,613,962 A | 9/1986 | Inoue et al. | |
| 4,631,611 A | 12/1986 | Schneider | |
| 4,663,682 A | 5/1987 | McNeil | |
| 4,672,490 A | 6/1987 | Shigenai et al. | |
| 4,703,375 A | 10/1987 | Chan et al. | |
| 4,742,410 A | 5/1988 | Smith | |
| 4,745,503 A | 5/1988 | Muraoka et al. | |

(Continued)

FOREIGN PATENT DOCUMENTS

| | | | | |
|---|---|---|---|---|
| FR | 2749696 A1 | 12/1997 | | |
| WO | WO-9827546 A1 | * 6/1998 | ............. | G11B 21/08 |

OTHER PUBLICATIONS

Cordle, M., "Effects of Skew Angle and Transition Curvature in HAMR Hard Disc Drives," a thesis submitted to the Faculty of the University of Minnesota, May 2017, 63 pages.

(Continued)

*Primary Examiner* — William J Klimowicz
(74) *Attorney, Agent, or Firm* — Westman, Champlin & Koehler, P.A.

(57) ABSTRACT

A data storage device includes a base, a data storage disk, an actuator arm, a suspension, and a piezoelectric actuator. The data storage disk is attached to the base and has a read/write surface defining an x-y plane. The actuator arm is attached to the base at a first pivot point to rotate parallel to the x-y plane. The suspension is attached to the actuator arm at a second pivot point, the suspension having a first end comprising a curved edge surface, and a second end supporting a head that is configured to interact with the read/write surface. The piezoelectric actuator is disposed on the actuator arm and comprises a biasing finger configured to contact the curved edge surface to rotate the suspension parallel to the x-y plane about the second pivot point. An actuator arm assembly and a method of use are also described.

20 Claims, 9 Drawing Sheets

(56) References Cited

U.S. PATENT DOCUMENTS

| | | | |
|---|---|---|---|
| 4,763,314 A | 8/1988 | McCaslin et al. | |
| 4,764,829 A | 8/1988 | Makino | |
| 4,792,707 A | 12/1988 | Katanuma | |
| 4,800,818 A | 1/1989 | Kawaguchi et al. | |
| 4,819,108 A | 4/1989 | Seki et al. | |
| 4,888,751 A | 12/1989 | Yoshimaru et al. | |
| 4,902,971 A | 2/1990 | Guzik et al. | |
| 4,937,692 A | 6/1990 | Okutsu | |
| 4,974,104 A | 11/1990 | Ferguson et al. | |
| 5,007,712 A | 4/1991 | Kikuchi et al. | |
| 5,016,238 A | 5/1991 | Shtipelman et al. | |
| 5,029,030 A | 7/1991 | Luecke | |
| 5,043,964 A | 8/1991 | Suzuki | |
| 5,229,901 A | 7/1993 | Mallary | |
| 5,317,552 A | 5/1994 | Yamasaki | |
| 5,396,385 A | 3/1995 | Tangi et al. | |
| 5,467,238 A | 11/1995 | Lee et al. | |
| 5,493,463 A | 2/1996 | Hagen | |
| 5,521,778 A | 5/1996 | Boutaghou et al. | |
| 5,781,381 A * | 7/1998 | Koganezawa | G11B 5/4873 |
| | | | 360/294.6 |
| 5,796,558 A * | 8/1998 | Hanrahan | G11B 5/4873 |
| | | | 360/294.6 |
| 5,801,531 A | 9/1998 | Viches et al. | |
| 5,825,180 A | 10/1998 | Guzik | |
| 5,875,166 A | 2/1999 | Ikegame et al. | |
| 5,898,544 A * | 4/1999 | Krinke | G11B 5/5552 |
| 5,968,627 A | 10/1999 | Nigam et al. | |
| 6,025,975 A * | 2/2000 | Fard | G11B 21/106 |
| 6,043,957 A | 3/2000 | Hattori et al. | |
| 6,064,550 A * | 5/2000 | Koganezawa | G11B 5/5552 |
| 6,088,187 A * | 7/2000 | Takaishi | G11B 5/5552 |
| 6,088,194 A * | 7/2000 | Imaino | G11B 5/5552 |
| 6,157,521 A | 12/2000 | Utsunomiya | |
| 6,157,522 A * | 12/2000 | Murphy | G11B 5/4873 |
| 6,310,750 B1 | 10/2001 | Hawwa et al. | |
| 6,344,950 B1 | 2/2002 | Watson et al. | |
| 6,356,640 B1 | 3/2002 | Lin | |
| 6,362,933 B1 | 3/2002 | Sampietro et al. | |
| 6,369,988 B1 | 4/2002 | Yoshida et al. | |
| 6,480,361 B1 | 11/2002 | Patterson | |
| 6,549,377 B2 | 4/2003 | Yoshida et al. | |
| 6,614,627 B1 * | 9/2003 | Shimizu | G11B 5/4833 |
| 6,765,744 B2 | 7/2004 | Gomez et al. | |
| 6,972,924 B1 * | 12/2005 | Chen | G11B 5/5556 |
| 6,987,637 B2 | 1/2006 | Litvinov et al. | |
| 7,027,147 B2 | 4/2006 | Steenhoek et al. | |
| 7,072,147 B2 | 7/2006 | Limmer et al. | |
| 7,131,346 B1 * | 11/2006 | Buttar | G11B 27/36 |
| | | | 73/865.9 |
| 7,199,981 B2 | 4/2007 | Zabtcioglu | |
| 7,372,671 B2 | 5/2008 | Yazawa | |
| 7,375,930 B2 | 5/2008 | Yang et al. | |
| 7,489,464 B1 * | 2/2009 | McNab | G11B 5/59638 |
| | | | 360/75 |
| 7,492,542 B2 | 2/2009 | van Zyl | |
| 7,652,847 B2 | 1/2010 | Weiss et al. | |
| 7,672,083 B1 | 3/2010 | Yu et al. | |
| 7,710,683 B2 | 5/2010 | Craig et al. | |
| 8,958,172 B1 | 2/2015 | Hansen | |
| 8,958,173 B1 | 2/2015 | Hirano et al. | |
| 9,218,833 B1 | 12/2015 | Shah et al. | |
| 9,361,919 B1 | 6/2016 | Lieu et al. | |
| 10,192,575 B1 | 1/2019 | Resh | |
| 10,249,339 B1 | 4/2019 | Mendonsa et al. | |
| 10,269,380 B1 | 4/2019 | Sun et al. | |
| 10,431,246 B2 | 10/2019 | Zhu et al. | |
| 10,510,373 B1 | 12/2019 | Granz et al. | |
| 10,622,012 B1 | 4/2020 | Tu et al. | |
| 10,699,730 B1 | 6/2020 | Uefune et al. | |
| 10,706,879 B2 | 7/2020 | Garbarino | |
| 10,803,891 B1 | 10/2020 | Jacoby et al. | |
| 10,818,317 B1 | 10/2020 | Erden et al. | |
| 10,978,100 B1 | 4/2021 | Myers | |
| 11,037,590 B2 | 6/2021 | Nguyen et al. | |
| 11,062,734 B1 | 7/2021 | Brand | |
| 11,120,834 B1 | 9/2021 | Herdendorf et al. | |
| 11,348,610 B1 * | 5/2022 | Herdendorf | G11B 5/6058 |
| 11,348,611 B1 * | 5/2022 | Mendonsa | G11B 21/22 |
| 11,361,787 B1 * | 6/2022 | Mendonsa | G11B 5/55 |
| 2003/0128456 A1 * | 7/2003 | Shitara | G11B 5/5552 |
| 2004/0008609 A1 | 1/2004 | Fujibayashi et al. | |
| 2004/0087253 A1 | 5/2004 | Mahadev et al. | |
| 2004/0130320 A1 | 7/2004 | Guzik et al. | |
| 2004/0179465 A1 | 9/2004 | Kuwajima et al. | |
| 2004/0257710 A1 | 12/2004 | Limmer et al. | |
| 2005/0225875 A1 | 10/2005 | Wada et al. | |
| 2005/0280945 A1 | 12/2005 | Duvall et al. | |
| 2007/0279804 A1 | 12/2007 | White | |
| 2008/0084636 A1 | 4/2008 | Oh et al. | |
| 2010/0246068 A1 | 9/2010 | Lee | |
| 2011/0038074 A1 | 2/2011 | Viskochil et al. | |
| 2012/0206830 A1 | 8/2012 | Gao et al. | |
| 2014/0139953 A1 * | 5/2014 | Hatch | G11B 5/4873 |
| | | | 360/234.5 |
| 2016/0171993 A1 | 6/2016 | Okubo | |
| 2018/0301162 A1 | 10/2018 | Erden | |
| 2020/0027480 A1 | 1/2020 | Myers et al. | |
| 2020/0202891 A1 | 6/2020 | Mendonsa et al. | |
| 2020/0227077 A1 | 7/2020 | Sukla et al. | |
| 2021/0312945 A1 | 10/2021 | Mendonsa et al. | |

OTHER PUBLICATIONS

He, Z., Mou, J. and Chan, K., "Mechanisms of Minimum Skew Angle Actuation for Hard Disc Drives," MATEC Web of Conferences, EDP Sciences, 2016.

U.S. Appl. No. 16/862,287, filed Apr. 30, 2020, entitled "Split Ramp for Data Storage Devices", 22 pages.

U.S. Appl. No. 17/163,983, filed Feb. 1, 2021, entitled "Ramp Activation Systems for an Elevator Drive", 34 pages.

U.S. Appl. No. 17/172,684, filed Feb. 10, 2021, entitled "Adjusting HGA Z-height via HSA Elevator Using Head/Actuator Feedback", 24 pages.

Notice of Allowance from U.S. Appl. No. 17/389,950, dated Feb. 16, 2022, 10 pages.

Notice of Allowance from U.S. Appl. No. 17/233,818, dated Feb. 2, 2022, 7 pages.

Supplemental Notice of Allowability from U.S. Appl. No. 17/233,818, dated Feb. 24, 2022, 3 pages.

U.S. Appl. No. 17/389,950, filed Jul. 30, 2021, "Zero Skew Disk Drive With Dual Actuators", 56 pages.

U.S. Appl. No. 17/196,192, filed Mar. 9, 2021, "Rotating Ramp With Retraction Capability for a Disk Drive", 33 pages.

U.S. Appl. No. 17/016,326, filed Sep. 9, 2020, "Brake Crawler for Elevator-Type Hard Disk Drives", 30 pages.

U.S. Appl. No. 17/223,447, filed Apr. 6, 2021, "Data Storage Device Linear Actuator", 36 pages.

U.S. Appl. No. 17/233,818, filed Apr. 19, 2021, "Zero Skew Elevator System", 51 pages.

U.S. Patent Office issued prosecution for U.S. Appl. No. 17/233,818, filed Apr. 19, 2021, including Applicant Initiated Interview Summary dated Nov. 15, 2021, 2 pages; Non-Final Rejection dated Oct. 22, 2021, 8 pages; Requirement for Restriction-Election dated Sep. 20, 2021, 6 pages; 16 pages total.

* cited by examiner

ZERO SKEW WITH ULTRASONIC PIEZOELECTRIC SWING SUSPENSION

SUMMARY

In one embodiment, a data storage device comprises a base, a data storage disk, an actuator arm, a suspension, and a piezoelectric actuator. The data storage disk is attached to the base and has a read/write surface defining an x-y plane. The actuator arm is attached to the base at a first pivot point to rotate parallel to the x-y plane. The suspension is attached to the actuator arm at a second pivot point, the suspension having a first end comprising a curved edge surface, and a second end supporting a head that is configured to interact with the read/write surface. The piezoelectric actuator is disposed on the actuator arm and comprises a biasing finger configured to contact the curved edge surface to rotate the suspension parallel to the x-y plane about the second pivot point.

In another embodiment, an actuator arm assembly comprises an actuator arm, a suspension, and a piezoelectric actuator. The suspension is attached to the actuator arm at a pivot point, and the suspension comprises a curved edge surface. The piezoelectric actuator is disposed on the actuator arm and comprises a biasing finger configured to contact the curved edge surface to rotate the suspension about the pivot point.

In yet another embodiment, a method comprises rotating an actuator arm in a horizontal plane about a first pivot point, the actuator arm coupled to a suspension at a second pivot point; and selectively driving first and second electrodes of an ultrasonic piezoelectric actuator disposed on the actuator arm such that a biasing finger of the ultrasonic piezoelectric actuator contacts a curved edge surface of the suspension to rotate the suspension about the second pivot point.

Other features and benefits that characterize embodiments of the disclosure will be apparent upon reading the following detailed description and review of the associated drawings.

The figures may not be drawn to scale. In particular, some features may be enlarged relative to other features for clarity.

DETAILED DESCRIPTION OF ILLUSTRATIVE EMBODIMENTS

Embodiments of the disclosure relate to reducing or eliminating head skew while reading tracks on data storage disks in a data storage device (DSD). Prior to providing details regarding the different embodiments, a description of a suitable operating environment is provided below in connection with FIG. 1, which is for illustrative purposes only. Embodiments of the present disclosure are not limited to any particular operating environment and can be practiced within any number of different types of operating environments.

It should be noted that the same or similar reference numerals are used in different figures for the same or similar elements. All descriptions of an element also apply to all other versions of that element unless otherwise stated. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments in which the elements are indirectly connected, coupled or attached to each other.

Figure 1:
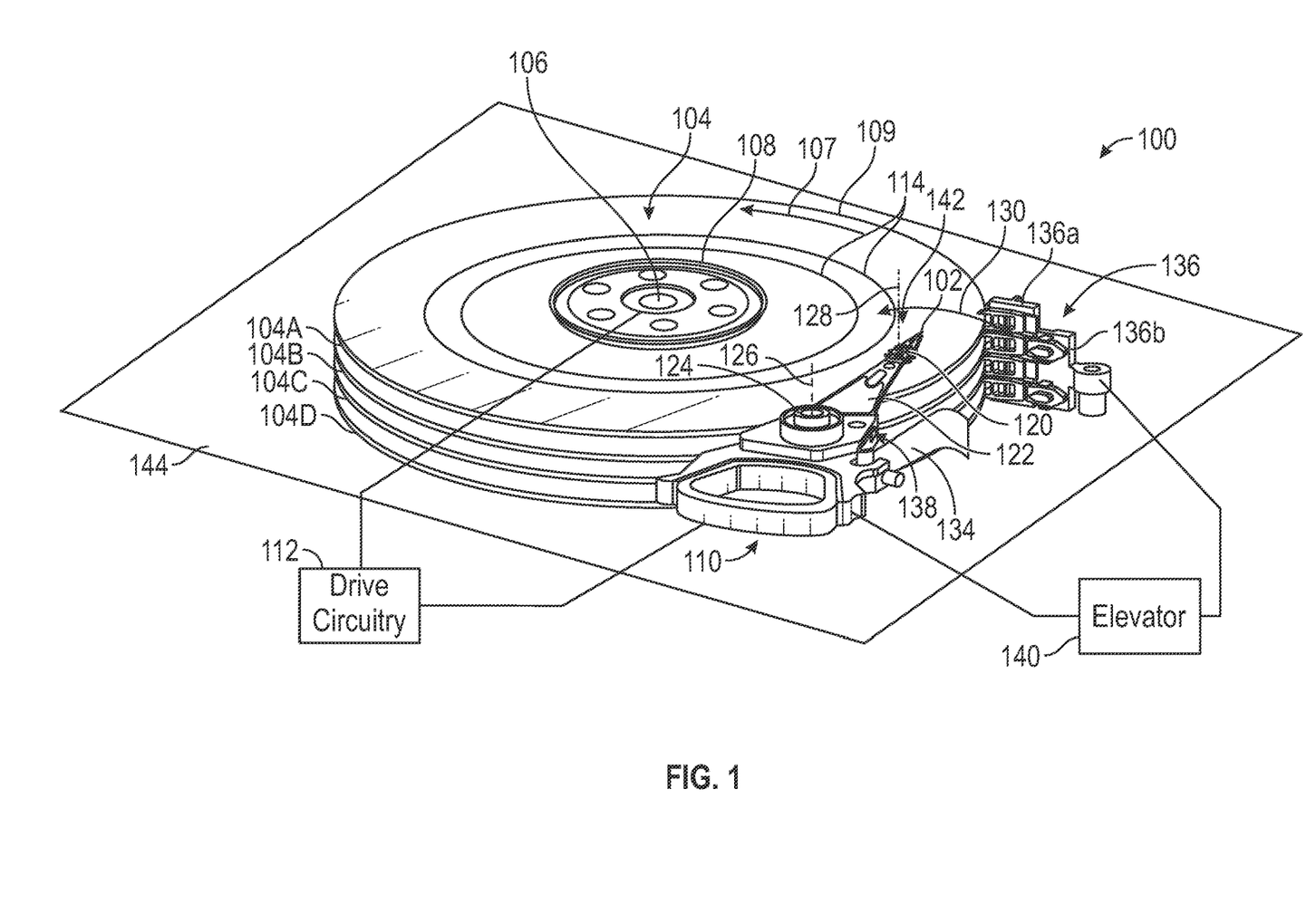
FIG. 1 is a schematic illustration of an exemplary data storage device.

FIG. 1 is a schematic illustration of a data storage device 100 including data storage media, heads for reading data from and/or writing data to the data storage media and a ramp for supporting the heads. In data storage device 100, heads 102 may be positioned over or under storage media 104 to read data from and/or write data to the data storage media 104. In the embodiment shown in FIG. 1, the data storage media 104 are rotatable data storage disks, with each disk 104 having opposing surfaces that serve as data storage surfaces. For read and write operations, a spindle 106 rotates the media 104 as illustrated by arrow 107. An actuator mechanism 110 positions the heads 102 relative to data tracks 114 on the rotating media 104 between an inner diameter (ID) 108 and an outer diameter (OD) 109. Both the spindle 106 and actuator mechanism 110 are connected to and operated through drive circuitry 112 (schematically shown).

Each of heads 102 is coupled to the actuator mechanism 110 through a suspension assembly which includes a load beam 120 connected to an actuator arm 122 of the mechanism 110, for example through a swage connection. The actuator mechanism 110 is rotationally coupled to a frame or base deck 144 through a bearing 124 to rotate about axis or shaft 126. The actuator mechanism 110 moves the heads 102 in a cross-track direction as illustrated by arrow 130. Each of the heads 102 includes one or more transducer elements (not shown) coupled to head circuitry (not shown) through flex circuit 134.

In general, in order to keep read/write heads 102 from landing on disks 104 in a data storage device 100 when, for example, power is removed from the data storage device 100, and to prevent the heads 102 from colliding with outer edges of the disks 104 during load and unload operations, a head support ramp assembly 136 is provided adjacent to the OD 109 of the disks 104. In an exemplary data storage device 100, a number of heads 102 is less than a number of disk 104 surfaces.

In the particular embodiment shown in FIG. 1, data storage device 100 includes four disks 104A, 104B, 104C, 104D, with a total of 8 data storage surfaces, with fewer heads 102 than data storage surfaces. As noted earlier, each of the heads 102 is coupled to the actuator mechanism 110 through the suspension assembly that includes the load beam 120 connected to the actuator arm 122. The actuator mechanism 110, the load beams 120 and the actuator arm 122 are collectively referred to as a head stack assembly (HSA) 138. In data storage device 100 of FIG. 1, the HSA 138 may be moved along axis 126 to different positions under motive of an elevator 140, which is schematically shown in FIG. 1. In an uppermost position shown in FIG. 1, the heads 102 interact with a data storage surfaces of disk 104A. In other positions (not shown), which are below the uppermost position, the same heads interact with data storage surfaces of disks 104B, 104C and 104D. As shown in FIGS. 5-8, in an exemplary embodiment, actuator arm 122 carries upper and lower load beam suspensions 120a, 120b. Upper load beam suspension 120a carries an upwardly facing head 102 configured to read/write data to/from a disk surface above the head 102. Lower load beam suspension 120b carries a downwardly facing head 102 configured to read/write data to/from a disk surface below the head 102. Configurations of head support structures other than illustrated could be used.

Head support ramp assembly 136 supports head end 142 of HSA 138 when the HSA 138 is moved away from the data storage disk(s) 104. In some embodiments, head support ramp assembly 136 includes a first ramp portion 136a adjacent to the OD 109 of the data storage disk(s) 104 and a second ramp portion 136b adjacent to the first ramp portion 136a. In order to move the HSA 138 from either an upper position to a lower position or from a lower position to an upper position, the HSA 138 is first rotated about axis 126, or otherwise moved in the x-y plane, until a head end 142 of the HSA 138 is supported on the moveable portion 136b of the head-support ramp assembly 136. Then, the HSA 138 and the moveable portion 136b are moved in unison vertically (for example, in a z direction). An entire ramp 136 or a portion thereof can also be moved in the x-y plane off the disk stack, such as by retraction, flexing, or rotation, for example. Other ramp configurations can also be used, such as those described in the following commonly owned patent applications, which are hereby incorporated by reference: U.S. application Ser. No. 16/863,287 filed on Apr. 30, 2020, entitled "Split Ramp for Data Storage Devices;" and U.S. application Ser. No. 17/163,983 filed on Feb. 1, 2021, entitled "Ramp Activation Systems for an Elevator Drive."

In one embodiment, a base of elevator 140 may be driven up and down by a coil and a magnet (not shown) with hard stops at both ends that limit the extent of upward and downward movement of the HSA 138. In general, any suitable driving mechanism may be used to move elevator 140 up and down. Exemplary drivers for Z direction motion of elevator 140 include a ball screw with an internal motor, a voice coil motor, an inchworm style piezoelectric brake crawler, a linear motor, a shape memory alloy based actuator, and a combination of the above. More details on data storage devices are described in the following commonly owned patent application, which is hereby incorporated by reference: U.S. application Ser. No. 17/233,818 filed on Apr. 19, 2021, entitled "Zero Skew Elevator System." In some embodiments, an elevator is not used because the HSA includes the same number of heads as the number of disk surfaces, and many actuator arms are attached to an E-block of the actuator.

For use of heads 102 for reading and writing data relative to disk 104, actuator 110 is activated to rotate the actuator arm 122, to thereby move the head end 142 of HSA 136 off of the head support ramp assembly 136 and to the disk 104. In some illustrations, although a movable ramp portion 136b is not shown, such a ramp portion may be used with any embodiment of a disk storage device. Referring to FIGS. 1 and 3A-4, to move head end 142 of HSA 138A onto a disk 104, arm 122 rotates about cylindrical bearing 124 and pivot axis 126. One can appreciate that rotation of arm 122 about pivot axis 126 results in moving the head end 142 of HSA 138A in an arc-shaped cross track direction 130 that is not truly on a radius of the disk 104. Accordingly, with a rotary actuator arm 122, in most positions of the head 102 on disk 104, there is some skew between the head orientation and the true track orientation of a track 114. Accordingly, as shown in FIGS. 2A-4, a swing suspension is disclosed wherein the load beam suspension 120 is rotated relative to the actuator arm 122 at a second pivot axis 128 to reduce or eliminate any skew angle and align the head 102 with a selected track 114.

Figure 2A:
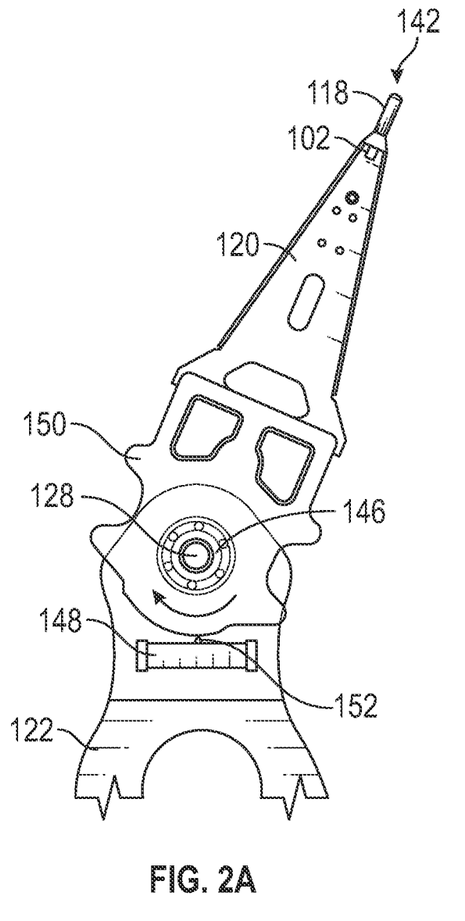
FIG. 2A is a top plan view of an exemplary load beam suspension of an actuator arm in one configuration.
Figure 2B:
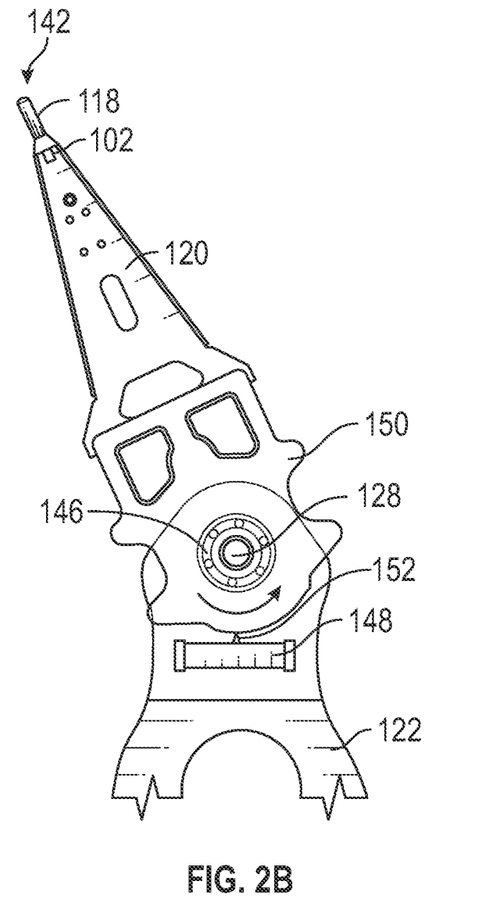
FIG. 2B is a top plan view of the exemplary load beam suspension of the actuator arm in a second configuration.

In an exemplary embodiment, HSA 138 is able to position head 102 relative to disk 104 in a selected cross disk position along arc 130 (about a first pivot axis 126) and with a corrected zero skew orientation of the head 102 relative to any particular track 114 due to rotation of load beam 120 relative to actuator arm 122 about a second pivot axis 128. As shown in FIGS. 2A and 2B, in an exemplary embodiment, load beam suspension 120 with rotary base plate 150 is connected to actuator arm 122 at second pivot axis 128. An ultrasonic piezoelectric actuator 148 is attached to actuator arm 122 and includes a biasing finger 152 that is configured to contact and move against a surface 168 (see FIG. 5) of the rotary base plate 150 in order to rotate the base plate 150 and its attached load beam suspension 120 about the second pivot axis 128. In some drawings, the rotary base plate 150 is shown as partially or fully transparent so that relative motion between the rotary base plate 150 and actuator arm 122 is more clearly visible.

Figure 3A:
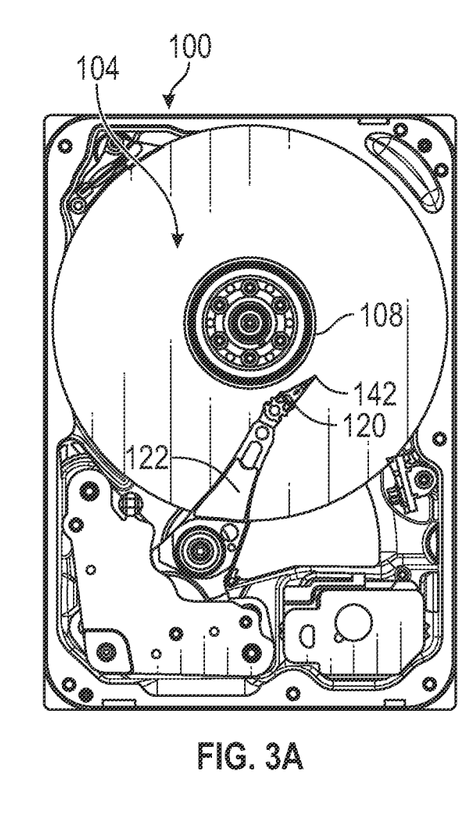
FIG. 3A is a top plan view of an exemplary data storage device with the actuator arm assembly positioned with its head end near an inner diameter of the data storage disk.
Figure 3B:
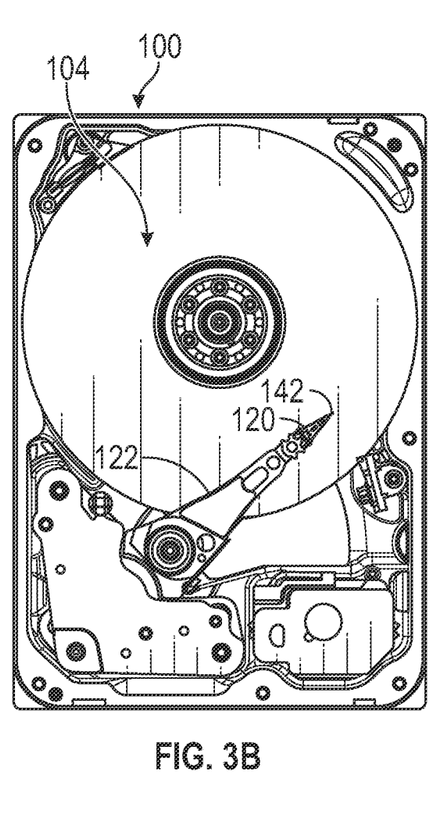
FIG. 3B is a top plan view of the exemplary data storage device with the actuator arm assembly positioned with its head end near a track between the inner and outer diameters of the data storage disk.
Figure 3C:
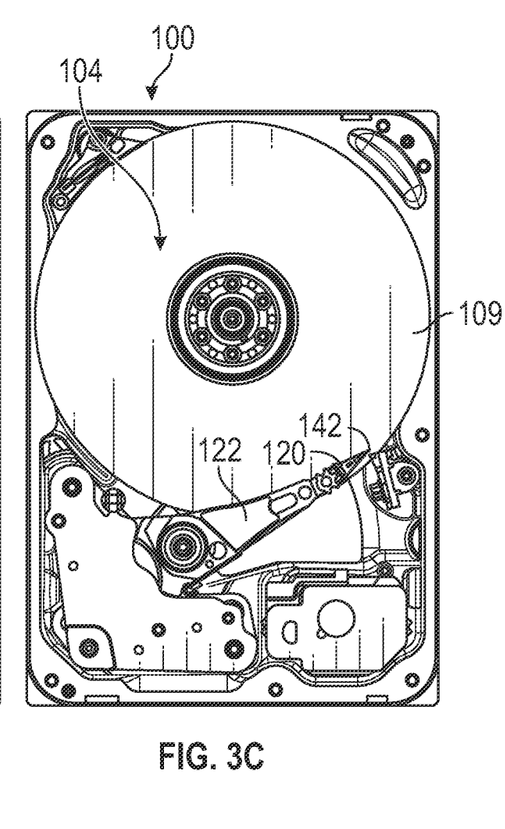
FIG. 3C is a top plan view of the exemplary data storage device with the actuator arm assembly positioned with its head end near an outer diameter of the data storage disk.
Figure 4:
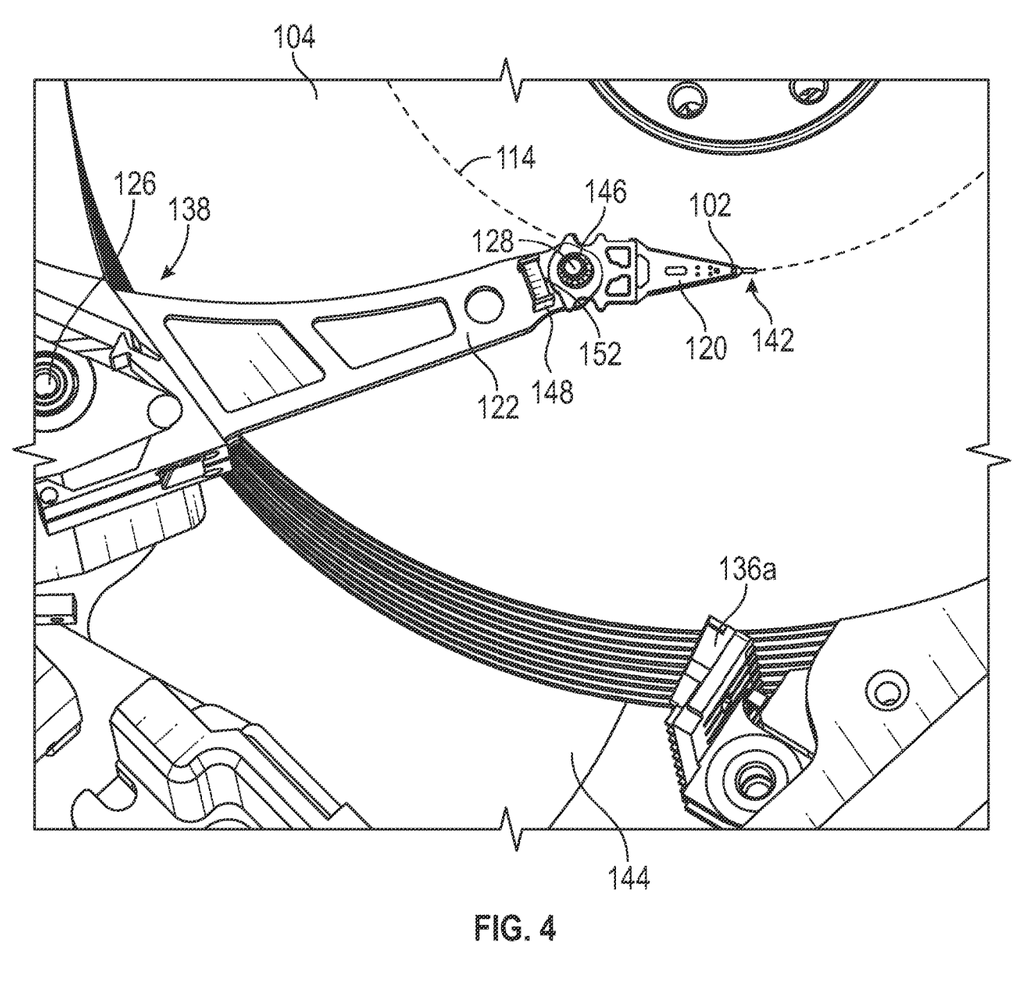
FIG. 4 is a top perspective view of a portion of an exemplary data storage device.

As shown in FIGS. 3A-4, such pivoting of the load beam suspension 120 relative to the end of actuator arm 122 allows a head 102 carried by the load beam 120 to be placed relative to any data track with 114 with little or no skew. As shown in FIGS. 3A-3C, this pivoting connection is dynamic, because relative swing positions of the load beam suspension and the actuator arm will change as the head 102 moves across the disk surface between a position near the inner diameter 108 of the disk 104, as shown in FIG. 3A, to an intermediate position as shown in FIG. 3B, and to a position shown in 3C, where the head 102 is positioned near an outer diameter 109 of the data storage disk 104. In an exemplary embodiment, load beam suspension 120 has a neutral position (as shown in FIGS. 1 and 3B) aligned with a longitudinal extent of the actuator arm 122 and is configured to rotate to a right of the neutral position (as shown in FIGS. 2A and 3A) and to a left of the neutral position (as shown in FIGS. 2B and 3C). In an exemplary embodiment, an ultrasonic piezoelectric actuator 148 is used for controlling an angle of the load beam 120 relative to the actuator arm 122 to align head 102 with a selected data track 114 with little or no skew. In an exemplary embodiment shown in FIGS. 5-7, pivot bearing 146 connects upper load beam portion 120a and lower load beam portion 120b to actuator arm 122.

Figure 5:
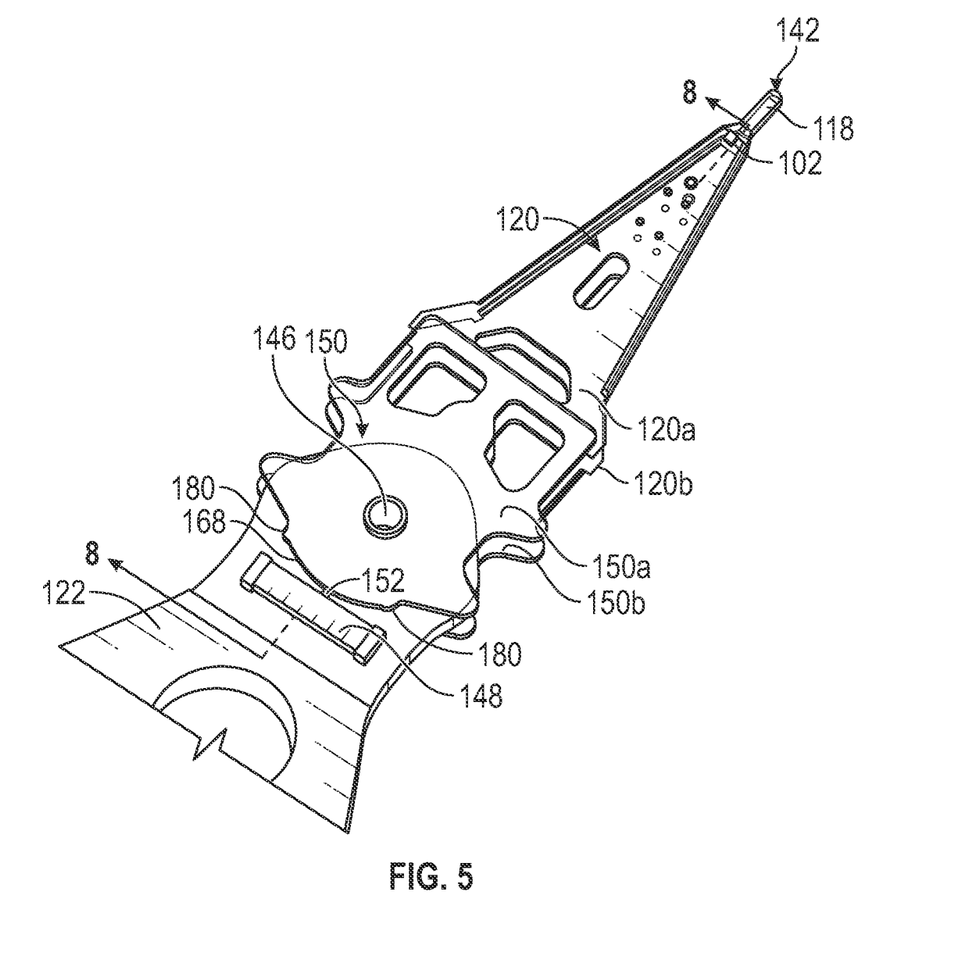
FIG. 5 is a top perspective view of an exemplary load beam suspension attached to an end portion of an actuator arm.
Figure 6:
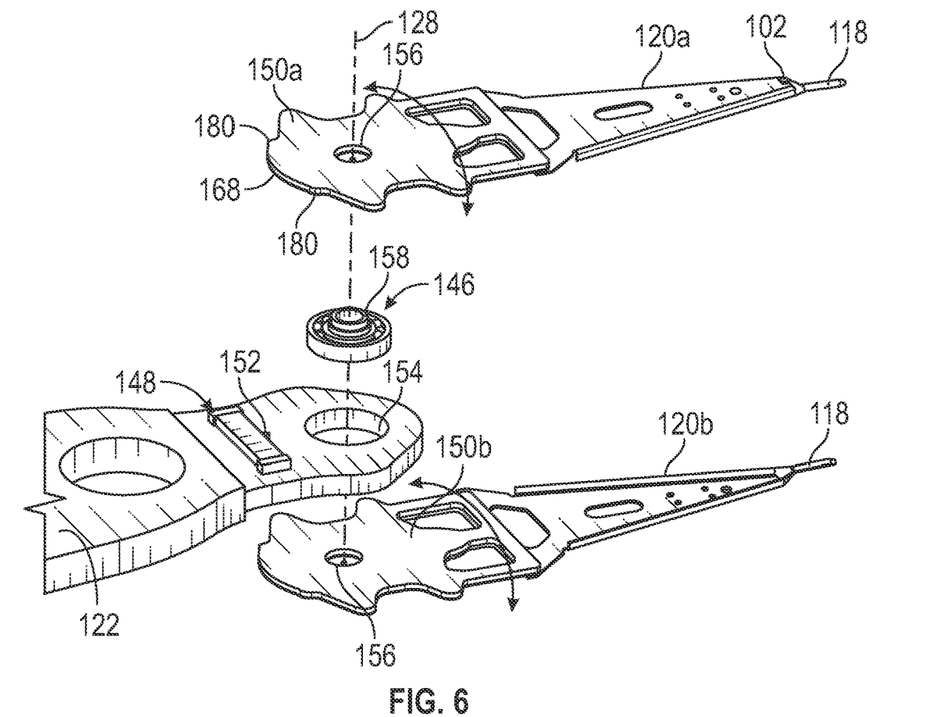
FIG. 6 is an exploded perspective view of the components of FIG. 5.
Figure 8:
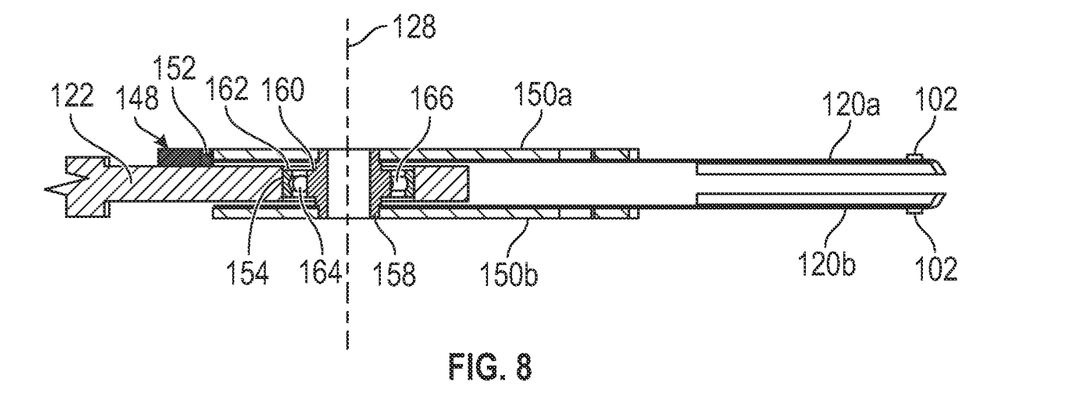
FIG. 8 is a cross-sectional view taken along line 8-8 of FIG. 5.

As shown in FIGS. 6 and 8, in some embodiments, upper load beam portion 120a and lower load beam portion 120b carry heads 102 (not shown) for reading and writing on top and bottom surfaces of a disk 104. As shown in FIGS. 5 and 6, a lift tab 118 extends from the load beam portions 120a, 120b to rest on the head support ramp assembly 136 when the disk drive storage device 100 is in an off or non-operating state.

FIG. 6 is an exploded view of a portion of an actuator arm 122 configured for pivotal connection to a load beam suspension assembly 120 (comprising upper load beam portion 120a and upper rotary base plate 150a, as well as lower load beam portion 120b and lower rotary base plate 150b). In an exemplary embodiment, relative positions of upper load beam portion 120a and upper rotary base plate 150a are fixed. Similarly, lower load beam portion 120b and lower rotary base plate 150b are mutually fixed to each other.

Figure 7:
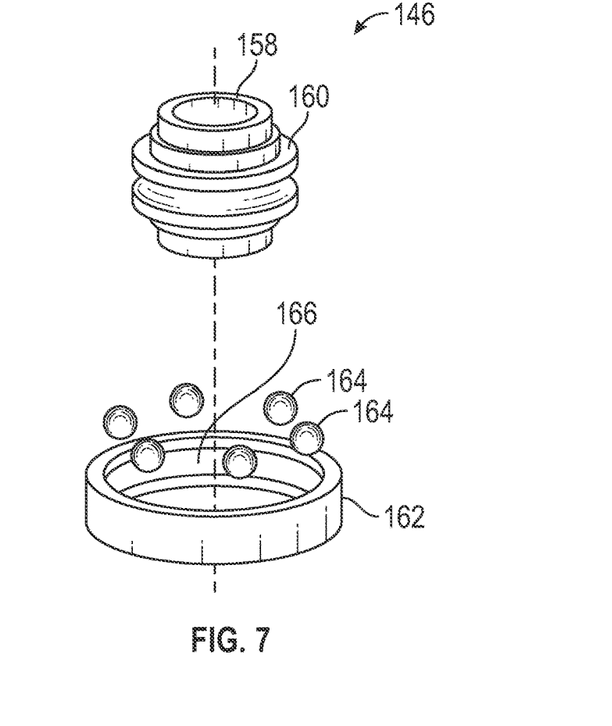
FIG. 7 is an exploded perspective view of a ball bearing assembly as shown in FIG. 6.

In an exemplary embodiment, an end of actuator arm 122 includes aperture 154 configured for the insertion of pivot bearing 146, which in an exemplary embodiment is a ball bearing. Each of upper rotary base plate 150a and lower rotary base plate 150b includes an aperture 156 for reception of a shaft 158 of the pivot bearing 146. As shown in FIG. 7, in an exemplary embodiment, pivot bearing 146 has an inner race 160 connected to shaft 158, an outer race 162, and a plurality of bearing balls 164 traveling in a channel 166 formed between the inner and outer races 160, 162.

In an exemplary embodiment, the shaft 158 of inner race 160 is fixed by adhesive to the upper and lower rotary base plates 150a, 150b at their respective apertures 156. Suitable adhesives include those used for pivot cartridges in rotary actuators, such as described in the commonly owned U.S. Pat. No. 10,192,575 for a "Split actuator with multiple head stack assemblies bonded to bearing sleeves," which is incorporated herein by reference. In an exemplary embodiment, outer race 162 is fixed by adhesive in aperture 154 of actuator arm 122. The balls 164 are configured to roll in channel 166, thereby allowing relative rotation of the inner and outer races 160, 162 of pivot bearing 146. In an exemplary embodiment, pivot bearing 146 is a small ball bearing with balls 164 having a ball diameter of about 0.25 millimeter. Such a ball bearing is commercially available from Minebea Mitsumi of Tokyo, Japan.

As shown in FIGS. 4-9, in an exemplary embodiment, ultrasonic piezoelectric actuator 148 has a biasing finger 152 that frictionally engages arcuate surface 168 of upper rotary base plate 150a. Through such frictional engagement, and with the motions of biasing finger 152 against surface 168, as shown in the cycle of FIGS. 10A-10D, the actuation of the piezoelectric actuator 148 can move the upper base plate 150a in rotary directions about second pivot axis 128, to thereby swing the load beam suspension 120 relative to the actuator arm 122, as shown in FIGS. 2A-4. In an exemplary embodiment, the biasing finger 152 is frictionally engaged directly with upper rotary base plate 150a. In turn, rotary base plate 150a is fixed with adhesive in aperture 156 to the shaft 158 of the pivot bearing 146. The lower rotary base plate 150b is likewise secured by adhesive in its aperture 156 to a lower portion of shaft 158. Thus, movement of the upper rotary base plate 150a causes simultaneous and unified motion of lower rotary base plate 150b, so that both of the upper load beam portion 120a and lower load beam portion 120b connected to a single actuator arm 122 rotate in unison about second pivot axis 128. In an exemplary embodiment, each of upper load beam portion 120a and lower load beam portion 120b carries a read/write head 102; thus, the two read/write heads 102 connected to a single actuator arm 122 also swing in unison about second pivot axis 128.

In an exemplary embodiment, piezoelectric actuator 148 has a standing wave ultrasonic piezoelectric motor, wherein motion of the upper rotary base plate 150a is caused by elliptical oscillation of biasing finger 152 against a contact point on arcuate surface 168. In some embodiments, surface 168 can include features that assist in this frictional engagement, such as a knurled or otherwise textured surface.

Figure 9:
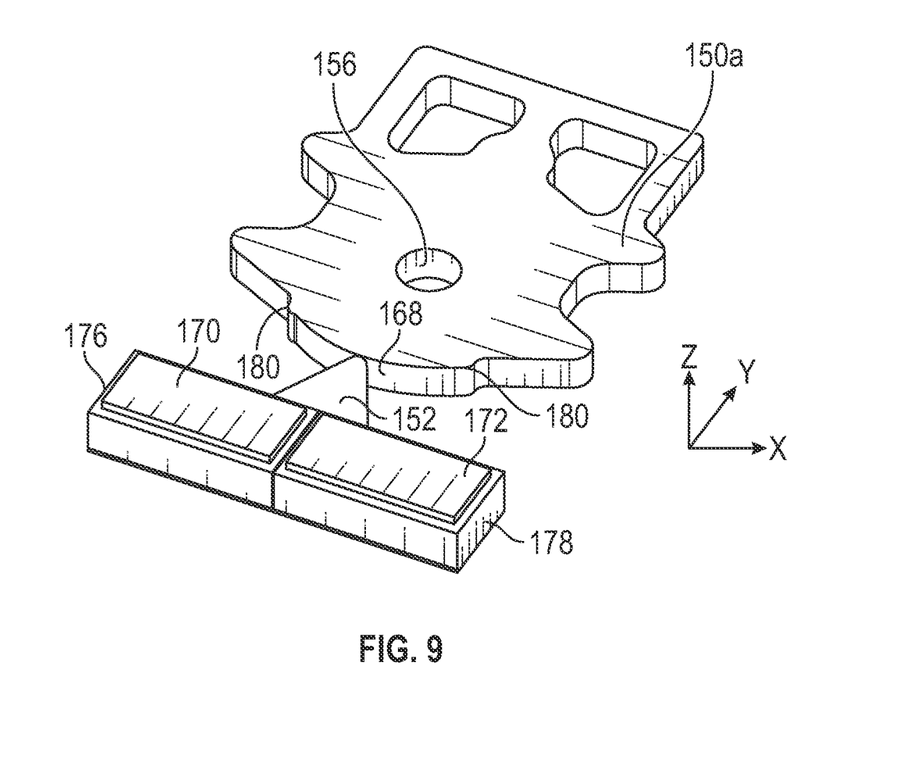
FIG. 9 is a top perspective view of an exemplary rotary base plate and piezoelectric actuator.
Figure 10A:
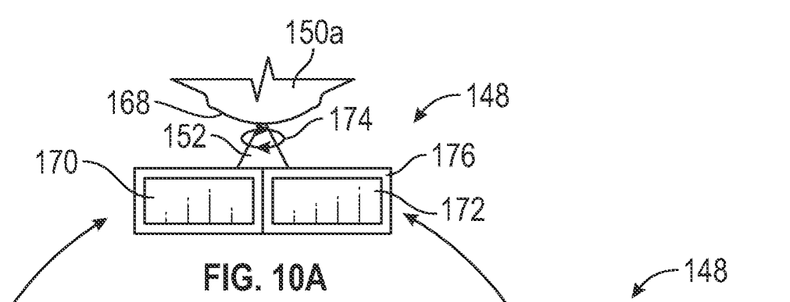
FIG. 10A is a top schematic view showing the working principle of the ultrasonic piezoelectric actuation in a first configuration in a cycle resulting in an elliptical movement trajectory of the biasing finger against the rotary base plate.
Figure 10B:
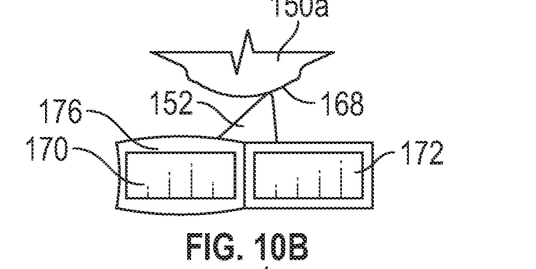
FIG. 10B is a top schematic view showing a second configuration in the cycle resulting in an elliptical movement trajectory of the biasing finger against the rotary base plate.
Figure 10C:
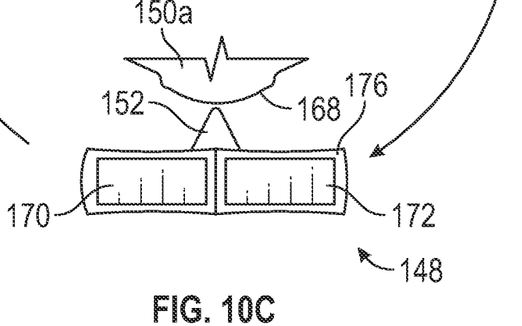
FIG. 10C is a top schematic view showing a third configuration in the cycle resulting in an elliptical movement trajectory of the biasing finger against the rotary base plate.
Figure 10D:
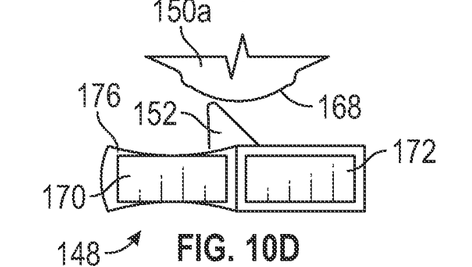
FIG. 10D is a top schematic view showing a fourth configuration in the cycle resulting in an elliptical movement trajectory of the biasing finger against the rotary base plate.

In an exemplary embodiment, as shown in FIGS. 9-10D, ultrasonic piezoelectric actuator 148 has two exciter electrodes 170, 172 disposed on a piezoceramic plate 176, which is backed by ground plate 178. In an exemplary embodiment, the piezoceramic plate 176 is polarized in the z direction. In an exemplary embodiment, the biasing finger 152 contacts surface 168 of the rotary base plate 150a with a preload to achieve an affirmative frictional engagement.

FIGS. 10A-10D are schematic illustrations of a vibration mode of operation of the ultrasonic piezoelectric actuator 148 in a cycle. In an exemplary embodiment, the actuation is based on asymmetric excitation of the piezoceramic layer 176 in a resonance mode of a two-dimensional standing extension wave. In an exemplary embodiment, sine wave voltage is applied to one of the electrodes 170, 172 while the other electrode is left free of voltage application. In the illustrated cycle, electrode 170 is excited while electrode 172 is left free of voltage. Thus, the piezoceramic layer 176 will extend and retract, thereby vibrating in a bimodal resonant manner. The illustration of motion of the biasing finger 152 is exaggerated for ease of understanding. Actuation of the ultrasonic piezoelectric actuator 148 results in the biasing finger 152 moving along an elliptical trajectory 174 against the surface 168 of the rotary base plate 150a. The direction of motion will be reversed by switching the sine wave voltage application to the other of the electrodes 170, 172. In an exemplary embodiment, the driving frequency is greater than about 60 kilohertz to avoid a suspension yaw mode. The motion trajectory of the contact point of biasing finger 152 can also be controlled by the amplitude and/or frequency of the drive signal. The term "ultrasonic" means that the frequency of oscillation lies outside of the audible frequency range for humans. Thus, the ultrasonic piezoelectric actuator motor 148 operates noiselessly. Additional advantages of an ultrasonic piezoelectric actuator motor over other types of actuators include low power consumption and thus low heat generation, which are obtainable by its operation at resonance, which is energetically more favorable than quasi-static operation.

In addition to moving head end 142 of the head stack assembly 138 to align the head 102 with a desired track 114, the slight movements of load beam suspension 120 caused by the ultrasonic piezoelectric actuator 148 can also be used to place the head 102 precisely with respect to a surface of disk 104, with finer motion gradations than can be achieved with the arm actuator mechanism 110. This feature allows the exemplary data storage system 100 to read data with increased track per inch (TPI) capability. Additional information relevant to high performance of a disk drive is provided in the following commonly owned patent applications and patents, which are hereby incorporated by reference: U.S. application Ser. No. 17/172,684 filed on Feb. 10, 2021, entitled "Adjusting HGA Z-height via HSA Elevator Using Head/Actuator Feedback;" US Published Patent Application No. 2004/0257710 for "Hard drive actuator arm with reduced skew variation;" U.S. Pat. No. 6,987,637 for "Magnetic recording system which eliminates skew angle effect;" U.S. Pat. No. 9,361,919 for "Disk drive with parallel head actuation;" U.S. Pat. No. 10,249,339 for "Read-after-write methodology using multiple actuators moveable over the same magnetic media;" and U.S. Pat. No. 10,818,317 for "Multi-actuator data storage system."

As shown in FIGS. 2A and 2B, the swing direction, speed and extent of motion of load beam suspension 120 relative to actuator arm 122 can be controlled by the amplitude, frequency and phase of the electrical voltage drive signals. In an exemplary embodiment, the load beam suspension 120 is able to swing left and right by approximately 17 radial degrees to achieve little or no skew of the head end 142 of head stack assembly 138 with respect to data tracks 114 at different locations of data zones on the disk 104, as shown in FIGS. 3A-3C. In an exemplary embodiment, rotary base plate 150 includes stops 180 (configured as surface protrusions and labeled in FIG. 5, for example) on surface 168 to prevent over-swinging of rotary base plate 150 (and therefore the load beam suspension 120) relative to actuator arm 122.

Figure 11:
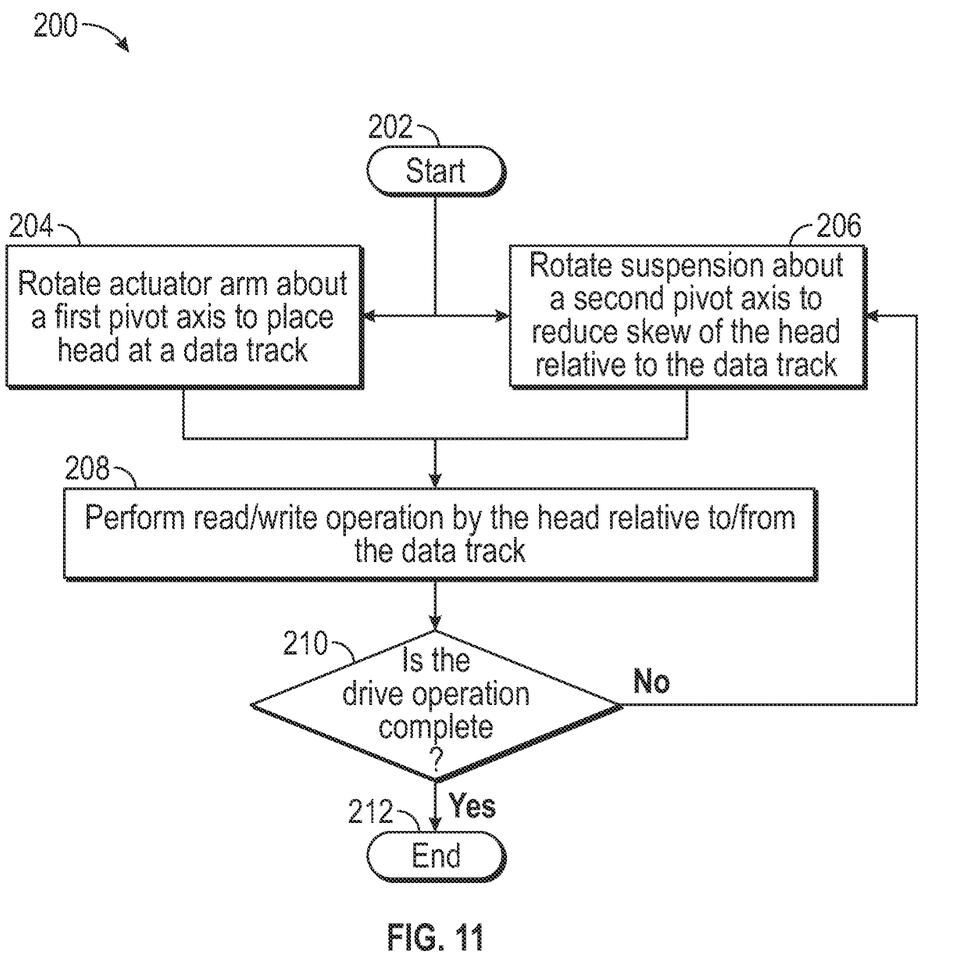
FIG. 11 is a flowchart of an exemplary method for using the described devices.

FIG. 11 is a flow chart illustrating an exemplary method for operation of the data storage device 100. The method starts at 202 and continues to 204 and 206, which can be performed simultaneously or one before the other. Substantially simultaneous performance of 204 and 206 reduces track access time. At 204, the actuator arm 122 is rotated about the first pivot axis 126 by the actuator mechanism 110 to place the head 102 connected to the actuator arm 122 at a data track 114 of data storage disk 104. At 206, head circuitry and associated controllers actuate the ultrasonic piezoelectric actuator 148 to rotate the load beam suspension 120 about a second pivot axis 128 to reduce skew of the head 102 relative to the selected data track 114. At 208, a read/write operation is performed by the head 102 relative to the selected data track 114. At 210, a query asks if the operation of disk drive storage device 100 is complete. If no, the method returns to 204 and 206 to move the head 102 proximate another selected data track 114 and obtain a correct angle between the load beam suspension 120 and actuator arm 122. The method continues until the drive operation is complete, whereby the method ends at 212.

The illustrations of the embodiments described herein are intended to provide a general understanding of the structure of the various embodiments. The illustrations are not intended to serve as a complete description of all of the elements and features of apparatus and systems that utilize the structures or methods described herein. Features described with respect to any embodiment also apply to any other embodiment. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. All patent documents mentioned in the description are incorporated by reference.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to fewer than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. For example, features described with respect to one embodiment may be incorporated into other embodiments. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
   a base;
   a data storage disk attached to the base and having a read/write surface defining an x-y plane;
   an actuator arm attached to the base at a first pivot point to rotate parallel to the x-y plane;
   a suspension attached to the actuator arm at a second pivot point, the suspension having a first end comprising a curved edge surface, and a second end supporting a head that is configured to interact with the read/write surface; and
   a piezoelectric actuator disposed on the actuator arm and comprising a biasing finger configured to contact the curved edge surface to rotate the suspension parallel to the x-y plane about the second pivot point.

2. The data storage device of claim 1 comprising a ball bearing disposed at the second pivot point.

3. The data storage device of claim 2 wherein the ball bearing comprises:
   an inner race fixed to the suspension; and
   an outer race fixed the actuator arm.

4. The data storage device of claim 1 wherein the suspension has a neutral position aligned with a longitudinal extent of the actuator arm, and wherein the suspension is configured to rotate to a left and a right of the neutral position.

5. The data storage device of claim 1 wherein the suspension comprises an upper plate and a lower plate, and wherein the curved edge surface is disposed on the upper plate.

6. The data storage device of claim 1 wherein:
   the suspension comprises an upper plate and a lower plate; and
   a ball bearing is disposed at the second pivot point, wherein the ball bearing comprises an inner race fixed to both of the upper and lower plates of the suspension.

7. The data storage device of claim 1 wherein the piezoelectric actuator comprises first and second selectively excitable electrodes.

8. An actuator arm assembly comprising:
   an actuator arm;
   a suspension attached to the actuator arm at a pivot point, the suspension comprising a curved edge surface; and
   a piezoelectric actuator disposed on the actuator arm and comprising a biasing finger configured to contact the curved edge surface to rotate the suspension about the pivot point.

9. The actuator arm assembly of claim 8 comprising a ball bearing disposed at the pivot point.

10. The actuator arm assembly of claim 9 wherein the ball bearing comprises:
    an inner race fixed to the suspension; and
    an outer race fixed the actuator arm.

11. The actuator arm assembly of claim 8 wherein the suspension has a neutral position aligned with a longitudinal extent of the actuator arm, and wherein the suspension is configured to rotate to a left and a right of the neutral position.

12. The actuator arm assembly of claim 8 wherein the suspension comprises an upper plate and a lower plate, and wherein the curved edge surface is disposed on the upper plate.

13. The actuator arm assembly of claim 8 wherein:
    the suspension comprises an upper plate and a lower plate; and
    a ball bearing is disposed at the pivot point, wherein the ball bearing comprises an inner race fixed to both of the upper and lower plates of the suspension.

14. The actuator arm assembly of claim 8 wherein the piezoelectric actuator comprises first and second selectively excitable electrodes.

15. The actuator arm assembly of claim 8 wherein the curved edge surface comprises a stop configured to arrest rotation of the suspension about the pivot point.

16. A method comprising:
    rotating an actuator arm in a horizontal plane about a first pivot point, the actuator arm coupled to a suspension at a second pivot point; and
    selectively driving first and second electrodes of an ultrasonic piezoelectric actuator disposed on the actuator arm such that a biasing finger of the ultrasonic piezoelectric actuator contacts a curved edge surface of the suspension to rotate the suspension about the second pivot point.

17. The method of claim 16 wherein selectively driving first and second electrodes causes an elliptical motion trajectory of the biasing finger relative to the curved edge surface.

18. The method of claim 16 wherein rotating the suspension relative to the actuator arm reduces a skew of a first read/write head carried by the suspension relative to a data track of a data storage disk.

19. The method of claim 18 wherein:
    the suspension carries a second read/write head; and
    selectively driving the first and second electrodes of the ultrasonic piezoelectric actuator moves the first and second read/write heads in unison.

20. The method of claim 16 wherein:
    the suspension has a neutral position aligned with a longitudinal extent of the actuator arm;
    selectively driving the first and second electrodes of the ultrasonic piezoelectric actuator in a first operation rotates the suspension to a left of the neutral position; and
    selectively driving the first and second electrodes of the ultrasonic piezoelectric actuator in a second operation rotates the suspension to a right of the neutral position.

* * * * *